United States Patent
Nakae et al.

(10) Patent No.: US 9,982,483 B2
(45) Date of Patent: May 29, 2018

(54) SCREEN DEVICE

(71) Applicant: HAYASHIGUCHI MFG CO., LTD., Tsu-shi, Mie (JP)

(72) Inventors: Kazuhiro Nakae, Tokyo (JP); Norio Hayashiguchi, Tsu (JP)

(73) Assignee: HAYASHIGUCHI MFG CO., LTD., Tsu-shi, Mie (JP)

( * ) Notice: Subject to any disclaimer, the term of this patent is extended or adjusted under 35 U.S.C. 154(b) by 0 days. days.

(21) Appl. No.: 15/307,280

(22) PCT Filed: Apr. 3, 2015

(86) PCT No.: PCT/JP2015/060592
§ 371 (c)(1),
(2) Date: Oct. 27, 2016

(87) PCT Pub. No.: WO2015/166765
PCT Pub. Date: Nov. 5, 2015

(65) Prior Publication Data
US 2017/0044826 A1 Feb. 16, 2017

(30) Foreign Application Priority Data

Apr. 30, 2014 (JP) ................................. 2014-093573

(51) Int. Cl.
*A47H 3/00* (2006.01)
*E06B 9/17* (2006.01)
(Continued)

(52) U.S. Cl.
CPC .................. *E06B 9/58* (2013.01); *E06B 9/42* (2013.01); *E06B 9/581* (2013.01); *G03B 21/58* (2013.01)

(58) Field of Classification Search
CPC ... E06B 9/58; E06B 9/581; E06B 9/42; E06B 2009/585; E06B 2009/582; E06B 2009/587; E06B 2009/588
(Continued)

(56) References Cited

U.S. PATENT DOCUMENTS 3,220,469 A * 11/1965 Oehmig .................... E06B 9/52
160/380
4,233,790 A * 11/1980 Meadows ............... E06B 3/285
160/395
(Continued)

FOREIGN PATENT DOCUMENTS

EP 2085560 A2 8/2009
EP 3130741 A1 2/2017
(Continued)

OTHER PUBLICATIONS

Office action of corresponding JP application No. 2014-093573 dated May 23, 2017 and English translation thereof.

*Primary Examiner* — Katherine W Mitchell
*Assistant Examiner* — Jeremy C Ramsey
(74) *Attorney, Agent, or Firm* — Muncy, Geissler, Olds & Lowe, P.C.

(57) ABSTRACT

A screen apparatus X1 includes: a screen member 22; an inner guider 60 extending in a vertical direction of the screen member 22 and holding a side end 22*a* of the screen member 22 movably in the vertical direction of the screen member 22 while regulating a displacement of the screen member 22 in a lateral direction of the screen member 22; and an outer guider 50 extending in the vertical direction of the screen member 22 and having a recess 54 for accommodating the inner guider 60, wherein the outer guider 50 holds the inner guider 60 dismountably from the recess 54 in the lateral direction of the screen member 22.

4 Claims, 9 Drawing Sheets

(51) Int. Cl.
*E06B 9/58* (2006.01)
*E06B 9/42* (2006.01)
*G03B 21/58* (2014.01)

(58) Field of Classification Search
USPC .................................................. 160/391, 392
See application file for complete search history.

(56) References Cited

U.S. PATENT DOCUMENTS

| | | | |
|---|---|---|---|
| 7,699,091 B2* | 4/2010 | Fisher, Sr. ............. | E04F 10/02 160/393 |
| 7,793,702 B2* | 9/2010 | Biewer .................. | B60J 7/0007 160/272 |
| 8,602,081 B2* | 12/2013 | Komatsu ................. | E06B 9/13 160/273.1 |
| 9,371,689 B2* | 6/2016 | Licciardi Di Stefano ..................... | E06B 9/42 |
| 2014/0076507 A1* | 3/2014 | Dibben .................... | E06B 9/58 160/272 |
| 2017/0037682 A1 | 2/2017 | Nakae et al. | |

FOREIGN PATENT DOCUMENTS

| | | |
|---|---|---|
| JP | H06-029440 Y2 | 8/1994 |
| JP | H11-141250 A | 5/1999 |
| JP | 2004-211298 A | 7/2004 |
| JP | 2005-273224 A | 10/2005 |
| JP | 2012-172505 A | 9/2012 |
| JP | 2013-001217 A | 1/2013 |
| WO | 2012/050518 A1 | 4/2012 |

\* cited by examiner

SCREEN DEVICE

TECHNICAL FIELD

The present invention relates to a screen apparatus.

BACKGROUND ART

Conventionally, a roll-up type screen apparatus described in Patent Literature 1 is, for example, known as a screen apparatus. The roll-up type screen apparatus includes a net, a roll-up shaft on which the net is wound, an engaging member attached to a side end of the screen member in a lateral direction thereof, a hollow fitter member for accommodating the engaging member, and a hollow support member for accommodating the fitter member. The fitter member serves as a rail member, and regulates a displacement of the screen member in the lateral direction thereof and further permits a displacement of the screen member in a vertical direction thereof by accommodating the engaging member therein. The support member serves as a rail accommodating member and accommodates the fitter member in the lateral direction of the screen member to keep the fitter member from dismounting from the support member.

In the aforementioned roll-up type screen apparatus, the rail member regulates the displacement of the screen member in the lateral direction of the screen member, and the rail accommodating member regulates dismounting of the rail member from the rail accommodating member. Hence, for example, when the maintenance of the screen member is performed, it is necessary to remove the screen member from the roll-up type screen apparatus in the below-described manner. First, the rail accommodating member is detached from a frame unit to which the rail accommodating member is fixedly attached along a window frame. Next, the rail member and the engaging member are moved out from the rail accommodating member in the vertical direction of the screen member. In this manner, the screen member is removed from the roll-up type screen apparatus.

As described above, complicated operations are required to remove a screen member from a roll-up type screen apparatus.

CITATION LIST

Patent Literature

Patent Literature 1: Japanese Unexamined Utility Model Publication No. HEI 6-29440

The present invention has an object of providing a screen apparatus which has solved the aforementioned problems.

SUMMARY OF INVENTION

A screen apparatus according to one aspect of the present invention includes: a screen member; a rail member extending in a vertical direction of the screen member and holding a side end of the screen member movably in the vertical direction while regulating a displacement of the screen member in a lateral direction of the screen member; and a rail accommodating member extending in the vertical direction and having a recess for accommodating the rail member, wherein the rail accommodating member holds the rail member dismountably from the recess in the lateral direction.

DESCRIPTION OF EMBODIMENTS

Hereinafter, an embodiment of the present invention will be described with reference to the accompanying drawings. However, it should be noted that, in consideration of explanation, the respective drawings to be referred to hereafter are simply illustrated by primary components required to describe the present invention among constituent components of the embodiment of the present invention. Therefore, a screen apparatus according to the present invention may be provided with desired constituent components unillustrated in the respective drawings referred to in the present specification.

Figure 1:
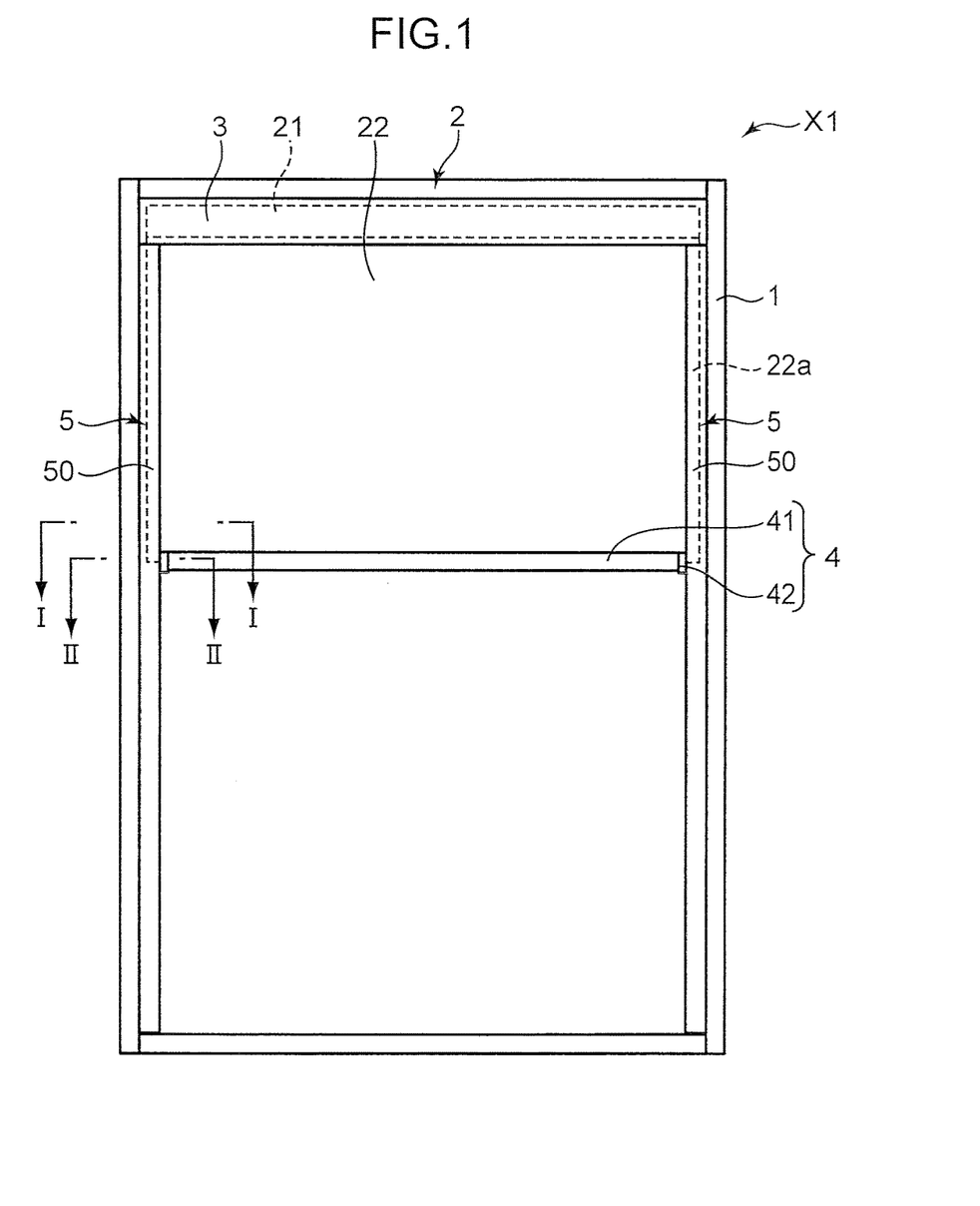
FIG. 1 is a schematic plan view illustrating a screen apparatus according to an embodiment of the present invention.
Figure 2:
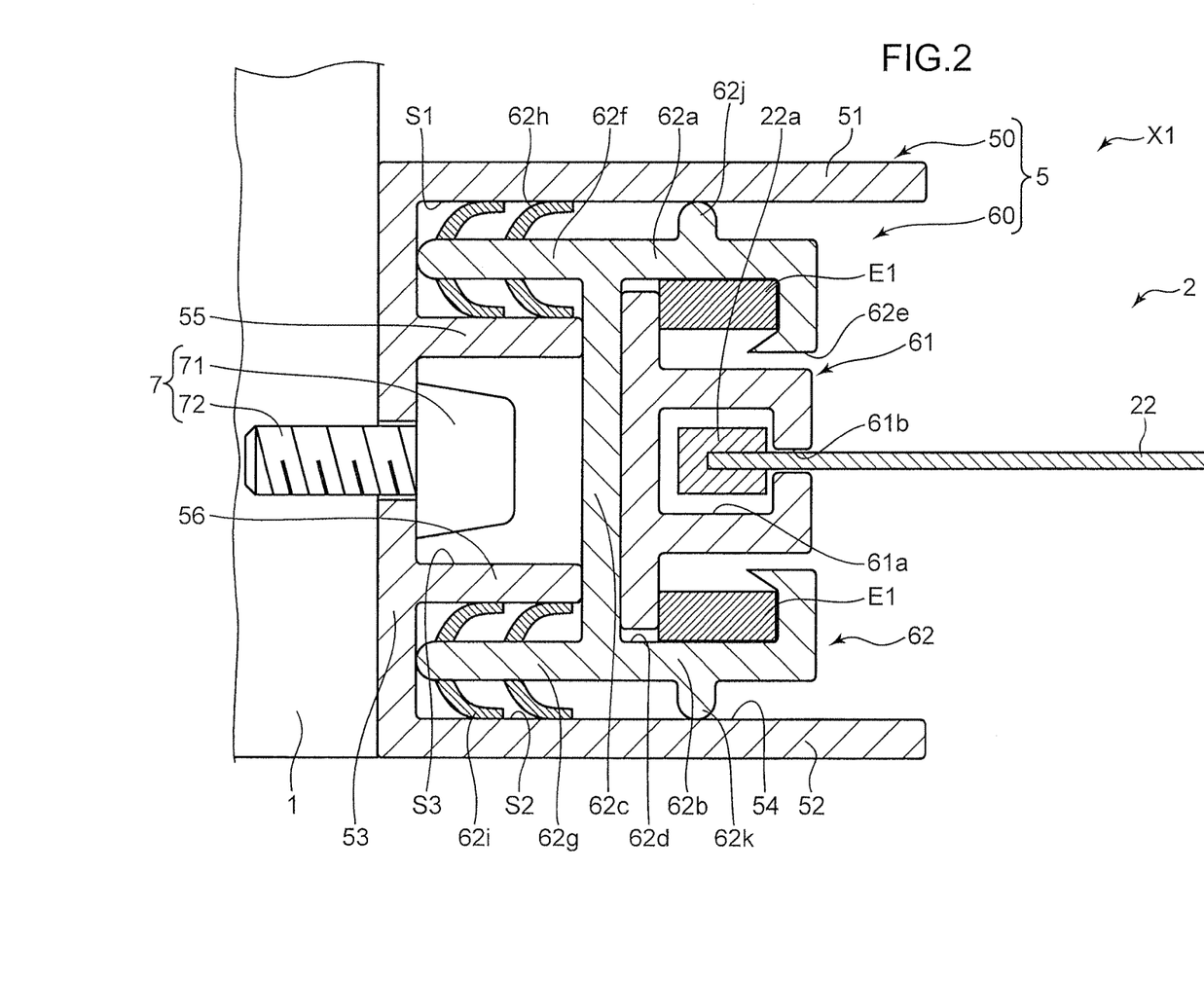
FIG. 2 is a cross sectional view taken along the line I-I in FIG. 1.
Figure 3:
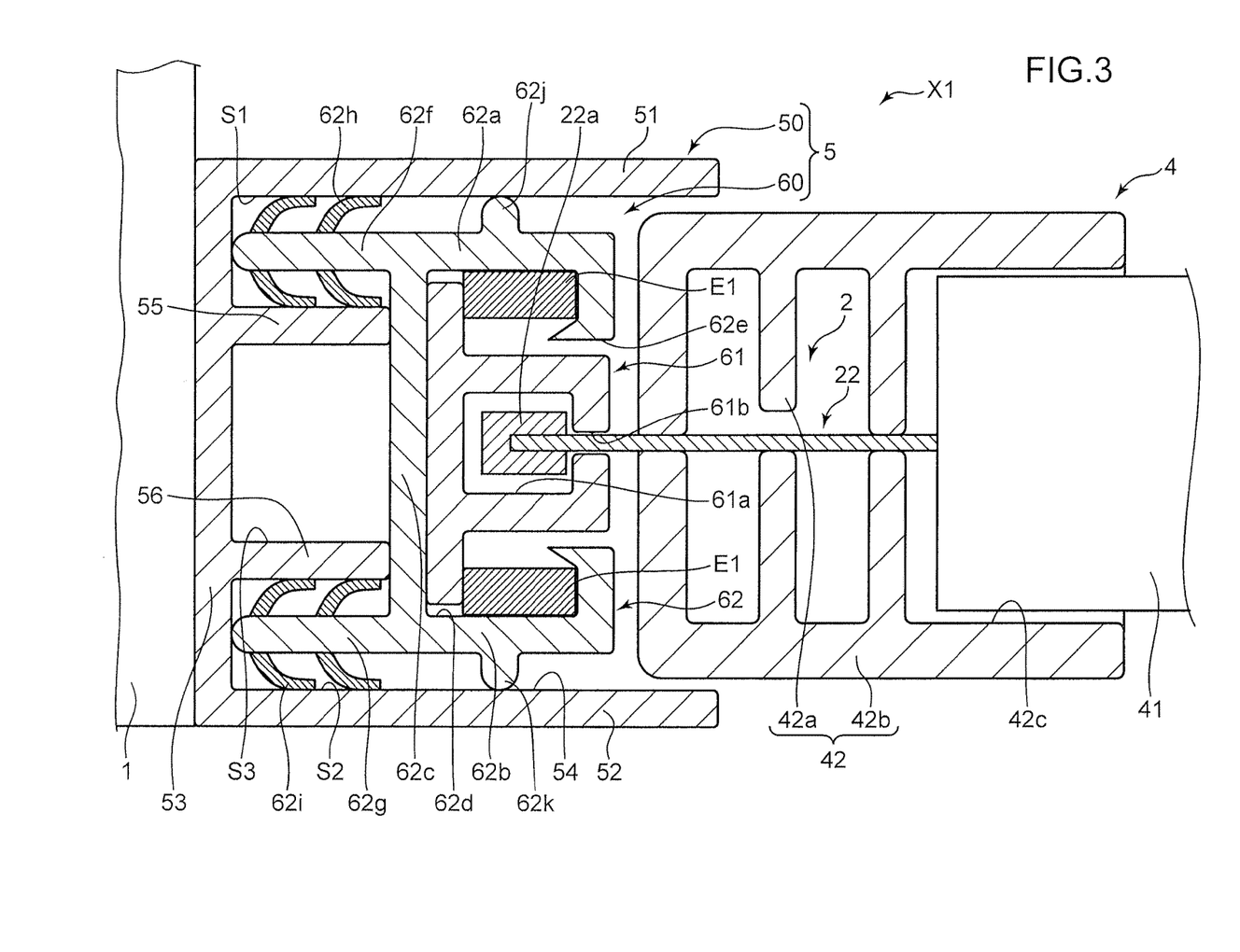
FIG. 3 is a cross sectional view taken along the line II-II in FIG. 1.

As illustrated in FIGS. 1 to 3, a screen apparatus X1 is a roll-up type screen apparatus adoptable to a window frame of a house or the like. The screen apparatus X1 includes a frame unit 1, a roll screen 2, a front cover 3, a weight bar 4, a pair of guiders 5, and a plurality of fastening members 7. For example, the screen apparatus X1 may have a structure wherein a screen member 22 to be described later is rolled up by an electric motor, or another structure wherein the screen member 22 is manually rolled up by such as a chain. Also, the present invention may be applicable to a screen apparatus of other type in addition to the roll-up type. The present invention may be also applicable to, for example, a projector screen or the like, in addition to a window frame of a house.

The frame unit 1 constitutes an outer frame of the screen apparatus X1. In the present embodiment, the frame unit 1 has a rectangular shape in a plan view. Also, a rectangular region surrounded by the frame unit 1 is covered with the screen member 22 to be described later. Furthermore, the shape of the frame unit 1 is not limited to a rectangle in the plan view, but may be suitably changed in accordance with a use of the screen apparatus X1. Furthermore, the screen apparatus X1 may be made without a frame unit 1. For example, a window frame of a house or the like may be utilized as the frame unit 1.

The roll screen 2 includes a roll-up shaft 21 and the screen member 22.

The roll-up shaft 21 serves to roll up the screen member 22. The roll-up shaft 21 is a cylindrical member extending in a short direction of the frame unit 1. The roll-up shaft 21 is arranged along an upper member of the frame unit 1 in the region surrounded by the frame unit 1. Additionally, the roll-up shaft 21 is attached to the members of the opposite both sides of the frame unit 1, and is rotatable in a circumferential direction of the roll-up shaft 21. However, the roll-up shaft 21 may be arranged along a lower member of the frame unit 1.

The screen member 22 serves to cover the region surrounded by the frame unit 1. An upper end of the screen member 22 is connected to the roll-up shaft 21. The screen member 22 is rolled up on the roll-up shaft 21 in accordance with the rotation of the roll-up shaft 21 to thereby expose a part of or entirety of the region surrounded by the frame unit 1. Furthermore, the screen member 22 is loosed out from the roll-up shaft 21 in accordance with the rotation of the roll-up shaft 21 to thereby cover a part of or entirety of the region surrounded by the frame unit 1.

The screen member 22 has side ends 22a positioned at the opposite ends of the screen member 22 in a lateral direction thereof. The side ends 22a are respectively held by corresponding inner guiders 60 of the guiders 5 to be described later. Each of the side ends 22a has a larger thickness than the other parts of the screen member 22. For example, the side ends 22a may be configured by attaching fitter members to the opposite side ends of a sheet-like screen material in a lateral direction thereof in such a manner as to enclose the front and back surfaces of the screen member 22 at the opposite side ends. Moreover, for example, the side ends 22a may be configured by making the opposite side ends of the sheet-like screen material have a width greater than the other parts.

The front cover 3 serves to prevent the roll-up shaft 21 from being seen by a user. The front cover 3 is arranged in front of the roll-up shaft 21, i.e. on the user side, so as to overlap the roll-up shaft 21 in a plan view. For example, the front cover 3 is fixedly attached to the frame unit 1 by use of an unillustrated magnet sheet or the like.

The weight bar 4 serves to apply an appropriate tension to the screen member 22 in a vertical direction of the screen member 22 in a state where the screen member 22 has been loosed out from the roll-up shaft 21. The weight bar 4 includes a body 41 and a pair of right and left side caps 42. The body 41 extends in the lateral direction of the screen member 22. The body 41 is attached to a lower end of the screen member 22. The length of the body 41 is slightly shorter than the width of the screen member 22 in the lateral direction thereof. Also, the side caps 42 are attached to the opposite ends of the lower end of the screen member 22 that extend out from the right and left ends of the body 41. Specifically, as illustrated in FIG. 3, each of the side caps 42 includes one member 42a and the other member 42b. The one member 42a and the other member 42b are fixedly coupled with each other by an unillustrated fixing member, such as a his, in a state of sandwiching the lower end of the screen member 22 therebetween in a thickness direction of the screen member 22. The side cap 42 has a recess 42c defined by the one member 42a and the other member 42b. One end of the body 41 fits in the recess 42c. Furthermore, the other end of the side cap 42 that is opposite to the end defining the recess 42c is in a recess 54 of an outer guider 50 to be described later.

The guiders 5 serve to guide the vertical movement of the screen member 22. Each of the guiders 5 is arranged in the region surrounded by the frame unit 1 along each of the members of the opposite both sides of the frame unit 1. The guider 5 includes an outer guider 50 and an inner guider 60.

The outer guider 50 is a member corresponding to a rail accommodating member of a screen apparatus of the present invention. The outer guider 50 accommodates the inner guider 60 to thereby prevent the inner guider 60 from being seen by a user. The outer guider 50 is a C-like shaped member extending in the vertical direction of the screen member 22. The outer guider 50 includes a first side wall 51, a second side wall 52, a first bottom wall 53, the recess 54, a first intermediate wall 55, and a second intermediate wall 56.

The first side wall 51 and the second side wall 52 extend in the lateral direction of the screen member 22 from the opposite ends of the first bottom wall 53 being in contact with the side member of the frame unit 1 in the thickness direction of the screen member 22. The first side wall 51 and the second side wall 52 face each other in the thickness direction of the screen member 22. The space defined by the first side wall 51, the second side wall 52, and the first bottom wall 53 is the recess 54. Moreover, the first intermediate wall 55 and the second intermediate wall 56 respectively extend from the first bottom wall 53 in the recess 54 in the lateral direction of the screen member 22. The first intermediate wall 55 and the second intermediate wall 56 face each other in the thickness direction of the screen member 22. The widths of the first intermediate wall 55 and the second intermediate wall 56 in the lateral direction of the screen member 22 are narrower than the widths of the first side wall 51 and the second side wall 52 in the lateral direction of the screen member 22. Furthermore, the first intermediate wall 55 lies closer to the first side wall 51 than the second intermediate wall 56, and the second intermediate wall 56 lies closer to the second side wall 52 than the first intermediate wall 55. In the present embodiment, the space defied by the first side wall 51 and the first intermediate wall 55 is referred to as a first cavity S1. Also, the space defined by the second side wall 52 and the second intermediate wall 56 is referred to as a second cavity S2. Further, the space defined by the first intermediate wall 55 and the second intermediate wall 56 is referred to as a third cavity S3.

In the present embodiment, the outer guider 50 includes the first side wall 51, the second side wall 52, the first bottom wall 53, the recess 54, the first intermediate wall 55, and the second intermediate wall 56. However, the configuration should not be limited thereto. For the outer guider 50, any C-shaped member which can accommodate the inner guider 60 therein may be appreciated.

Here, the outer guider 50 is fastened to the frame unit 1 by the plurality of fastening members 7. Each of the fastening members 7 is a screwing member having a head 71 and a screw part 72. The screw part 72 extends from the recess 54 and passes through the first bottom wall 53 to reach the side member of the frame unit 1. In this configuration, the screw part 72 fastens the first bottom wall 53 and the side member of the frame unit 1. Further, the head 71 of the fastening member 7 lies in the third cavity S3 in a state where the screw part 72 fastens the outer guider 50 and the frame unit 1. In the present embodiment, the plurality of fastening members 7 are arranged with a predetermined distance thereamong in the vertical direction of the screen member 22, which is unillustrated. Moreover, the plurality of fastening members 7 fasten the outer guider 50 and the frame unit 1. The number and the arrangement of the fastening members 7 are desirably determined and can be suitably changed in accordance with a use of the screen apparatus X1.

The inner guider 60 is a member corresponding to a rail member of the screen apparatus of the present invention. The inner guider 60 serves to guide a vertical movement of the screen member 22. Like the outer guider 50, the inner guider 60 extends in the vertical direction of the screen member 22. The inner guider 60 includes a first rail member 61 and a second rail member 62.

The first rail member 61 serves to directly guide the vertical movement of the screen member 22. The first rail member 61 has a hollow shape. The first rail member 61 includes a first chamber 61a and a first slit 61b. The first chamber 61a is identical to the hollow portion of the first rail member 61. The first chamber 61a extends in the vertical direction of the screen member 22. The first slit 61b connects the first chamber 61a to the outside of the first rail member 61. The first slit 61b extends in the vertical direction of the screen member 22. The side end 22a of the screen member 22 is placed in the first chamber 61a by passing through the first slit 61b. In other words, the screen member 22 is in the inside and the outside through the first slit 61b.

The width of the first slit 61b in the thickness direction of the screen member 22 is narrower than the thickness of the side end 22a of the screen member 22. Hence, the first rail member 61 can regulate a displacement of the screen member 22 in the lateral direction thereof. Furthermore, the width of the first chamber 61a in the thickness direction of the screen member 22 is larger than the thickness of the side end 22a of the screen member 22. Therefore, the screen member 22 is movable in the vertical direction thereof in a state that the displacement of the screen member 22 in the lateral direction thereof is regulated.

The second rail member 62 holds the first rail member 61. The second rail member 62 includes a first opposite wall 62a, a second opposite wall 62b, a second bottom wall 62c, a second chamber 62d, a second slit 62e, a first extension 62f, a second extension 62g, a plurality of first protrusions 62h, and a plurality of second protrusions 62i, a first projection 62j, and a second projection 62k.

The first opposite wall 62a faces the second side wall 51. The second opposite wall 62b faces the second side wall 52. The second bottom wall 62c faces the first bottom wall 53. The space defined by the first opposite wall 62a, the second opposite wall 62b, and the second bottom wall 62c is the second chamber 62d for accommodating the first rail member 61. Moreover, the top wall of the second rail member 62 that is opposite to the second bottom wall 62c across the second chamber 62d is formed with the second slit 62e. The second chamber 62d passes through the second slit 62e and joins the outside of the second rail member 62. The second chamber 62d accommodates the first rail member 61. In this configuration, the wall of the first rail member 61 that is formed with the first slit 61b is exposed in the second slit 62e from the second chamber 62d. Also, an elastic member E1 is placed between an inner surface of the second rail member 62 and an outer surface of the first rail member 61. Accordingly, the distance between the first rail members 61 respectively arranged on the members of the opposite both sides of the frame unit 1 is adjusted. The distance is set to apply an appropriate tension to the screen member 22 in the lateral direction thereof.

The first projection 62j extends from the first opposite wall 62a to the first side wall 51 in the thickness direction of the screen member 22. The second projection 62k extends from the second opposite wall 62b to the second side wall 52 in the thickness direction of the screen member 22. The distance from the top of the first projection 62j to the top of the second projection 62k in the thickness direction of the screen member 22 is substantially the same as the width of the recess 54 of the outer guide rail 50 in the thickness direction. Hence, the second rail member 62 is placed in the recess 54 at the positions where the first projection 62j comes into contact with the first side wall 51 and the second projection 62k comes into contact with the second side wall 52. This configuration makes it possible to suppress the rattling of the inner guider 60 in the recess 54.

The first extension 62f extends from the end of the bottom wall 62c that is closer to the first opposite wall 62a to the first bottom wall 53 in the lateral direction of the screen member 22. The first extension 62f lies in the first cavity S1. The second extension 62g extends from the end of the second bottom wall 62c that is closer to the second opposite wall 62b to the first bottom wall 53 in the lateral direction of the screen member 22. The second extension 62g lies in the second cavity S2. The inner guider 60 is entirely mounted in the recess 54 of the outer guider 50 at insertion positions where the first extension 62f is inserted into the first cavity S1 and the second extension 62g is inserted in the second cavity S2. This configuration can prevent the inner guider 60 from being seen by the user in the thickness direction of the screen member 22. The insertion positions are contact positions between the leading ends of the first extension 62f and the second extension 62g, and the first bottom wall 53, or another contact positions between the leading ends of the first intermediate wall 55 and the second intermediate wall 56, and the second bottom wall 62c.

The number and the arrangement of the first extension 62f and the second extension 62g are desirably determined and can be suitably changed in accordance with a use of the screen apparatus X1. For example, it may be appreciated to provide a single extension extending from the center of the second bottom wall 62c to the first bottom wall 53 in the thickness direction of the screen member 22 so as to lie in the third cavity S3, in place of the first extension 62f and the second extension 62g. In this case, the head 71 of the fastening member 7 may be arranged to avoid the extension in the third cavity 3, or may be arranged in the first cavity S1 or the second cavity S2.

The first protrusions 62h extend from the first extension 62f in a direction intersecting an extending direction of the first extension 62f, i.e. intersecting the lateral direction of the screen member 22. Specifically, a part of the first protrusions 62h extends from the first extension 62f to the first side wall 51. Also, the remaining part of the first protrusions 62h extends from the first extension 62f to the first intermediate wall 55. Further, the first protrusions 62h elastically deform between the first extension 62f and the first side wall 51, and between the first extension 62f and the first intermediate wall 5 at the insertion position of the first extension 62h. In this configuration, the first protrusions 62h are in contact with the first side wall 51 and the first intermediate wall 55 by pressure. The second protrusions 62i extend from the second extension 62g in a direction intersecting an extending direction of the second extension 62g, i.e. interesting the lateral direction of the screen member 22. Specifically, a part of the second protrusions 62*i* extends from the second extension 62*g* to the second side wall 52. Also, the remaining part of the second protrusions 62*i* extends from the second extension 62*g* to the second intermediate wall 56. Moreover, the second protrusions 62*i* elastically deform between the second extension 62*g* and the second side wall 52, and between the second extension 62*g* and the second intermediate wall 56 at the insertion position of the second extension 62*g*. In this configuration, the second protrusions 62*i* are in contact with the second side wall 52 and the second intermediate wall 56 by pressure.

As described above, the first protrusions 62*h* and the second protrusions 62*i* are in contact with the inner surface of the outer guider 50 by pressure in the thickness direction of the screen member 22 at the insertion positions of the first extension 62*f* and the second extension 62*g*. Therefore, the inner guider 60 is held by the outer guider 50 without fastening operation by, for example, a screwing member. In this manner, the inner guider 60 is dismountable from the recess 54 of the outer guider 50 in the lateral direction of the screen member 22.

In the screen apparatus X1, a part of the first protrusions 62*h* extends from the first extension 62*f* to the first side wall 51, and the remaining part of the first protrusions 62*h* extends from the first extension 62*f* to the first intermediate wall 55. However, the configuration is not limited thereto. For example, the first protrusions 62*h* may extend from the first extension 62*f* only to the first side wall 51. Also, in the screen apparatus X1, a part of the second protrusions 62*i* extends from the second extension 62*g* to the second side wall 52, and the remaining part of the second protrusions 62*i* extends from the second extension 62*g* to the second intermediate wall 56. However, the configuration is not limited thereto. For example, the second protrusions 62*i* may extend from the second extension 62*g* only to the second side wall 52.

Moreover, in the screen apparatus X1, the inner guider 60 is constituted by the two members, i.e. the first rail member 61 and the second rail member 62. However, the configuration is not limited thereto. For example, the inner guider 60 may be constituted only by the second rail member 62, and the side end 22*a* of the screen member 22 may be directly placed in the second chamber 62*d*. In this case, the thickness of the side end 22*a* of the screen member 22 is set to be larger than the width of the second slit 62*e* in the thickness direction of the screen member 22. Furthermore, for example, the inner guider 60 may have a third rail member in addition to the first rail member 61 and the second rail member 62. Specifically, the third rail member is placed in the first chamber 61*a*, and includes a third chamber and a third slit. The side end 22*a* of the screen member 22 passes through the third slit to be placed in the third chamber. In this case, the thickness of the side end 22*a* of the screen member 22 is set to be larger than the width of the third slit in the thickness direction of the screen member 22.

As described above, in the screen apparatus X1, the outer guider 50 holds the inner guider 60 dismountably from the recess 54 in the lateral direction of the screen member 22. Hence, the maintenance capability of the screen member 22 will be increased. For example, in a screen apparatus in which an inner guider is fixedly mounted to an outer guider in such manner as to be dismountable from a recess in a lateral direction of the screen member, it is necessary to remove the screen member from the screen apparatus in the below-described way, when the maintenance of the screen member is performed. First, the outer guider is detached from a side member of a frame unit. Next, the inner guider is moved out from the recess of the outer guider in a vertical direction of the screen member to thereby remove an assembly of the screen member and the inner guider from the outer guider. In contrast, in the screen apparatus X1 according to the present embodiment, the inner guider 60 is dismountable from the recess 54 of the outer guider 50 in the lateral direction of the screen member 22. Hence, it is possible to dismount the inner guider 60 from the recess 54 of the outer guider 50 without detaching the outer guider 50 from the frame unit 1. Additionally, no complicated operations are required such as the operation of moving out the inner guider 60 from the recess 54 of the outer guider 50 in the vertical direction of the screen member 22. Accordingly, it is possible to easily separate the assembly of the screen member 22 and the inner guider 60 from the outer guider 50 to thereby achieve the increase in the maintenance capability of the screen member 22.

Moreover, in the screen apparatus X1, the first protrusions 62*h* and the second protrusions 62*i* elastically deform in the first cavity S1 and the second cavity S2. Also, the first protrusions 62*h* and the second protrusions 62*i* come into contact with the inner surface of the outer guider 50 by pressure in the thickness direction of the screen member 22. Owing to this configuration, the first extension 62*f* and the second extension 62*g* are held on the inner surface of the outer guider 50. Accordingly, it is possible to keep the first extension 62*f* and the second extension 62*g* from inadvertently shifting out from the first cavity S1 and the second cavity S2, thereby allowing the outer guider 50 to properly hold the inner guider 60.

Additionally, in the screen apparatus X1, the head 71 of the fastening member 7 is arranged in the third cavity S3. Therefore, the fastening member 7 can fastens the outer guider 50 and the side member of the frame unit 1 by utilizing the third cavity S3 which is the dead space between the first intermediate wall 55 and the second intermediate wall 56.

The above-described screen apparatus X1 can be efficiently and easily produced by, for example, a method including steps which will be described below. Hereinafter, a method for installing a screen apparatus X1 will be described with reference to FIGS. 4 to 8.

1) Step of Attaching a Roll Screen 2, a Body 41, and an Outer Guider 50.

Figure 4:
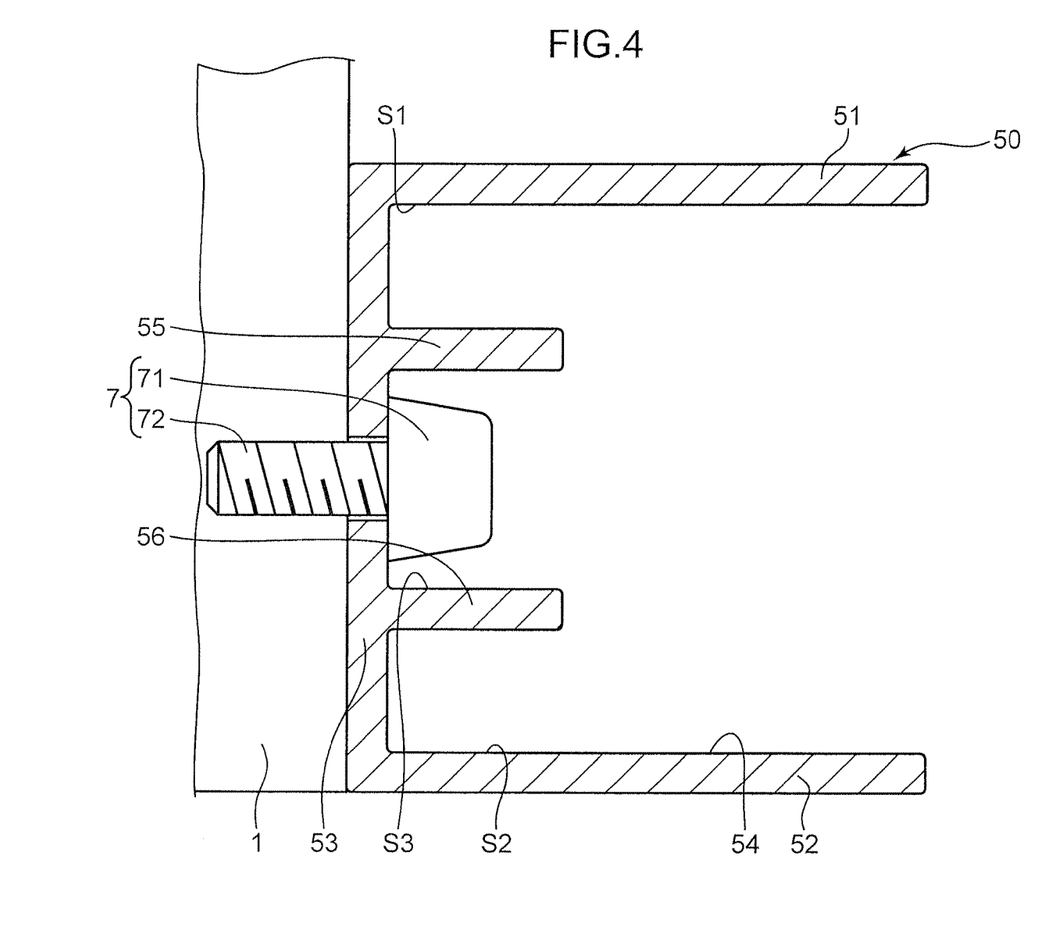
FIG. 4 is a schematic cross sectional view illustrating a state where an outer guider is attached to a frame unit, and showing a step of a production process of the screen apparatus according to the embodiment.
Figure 5:
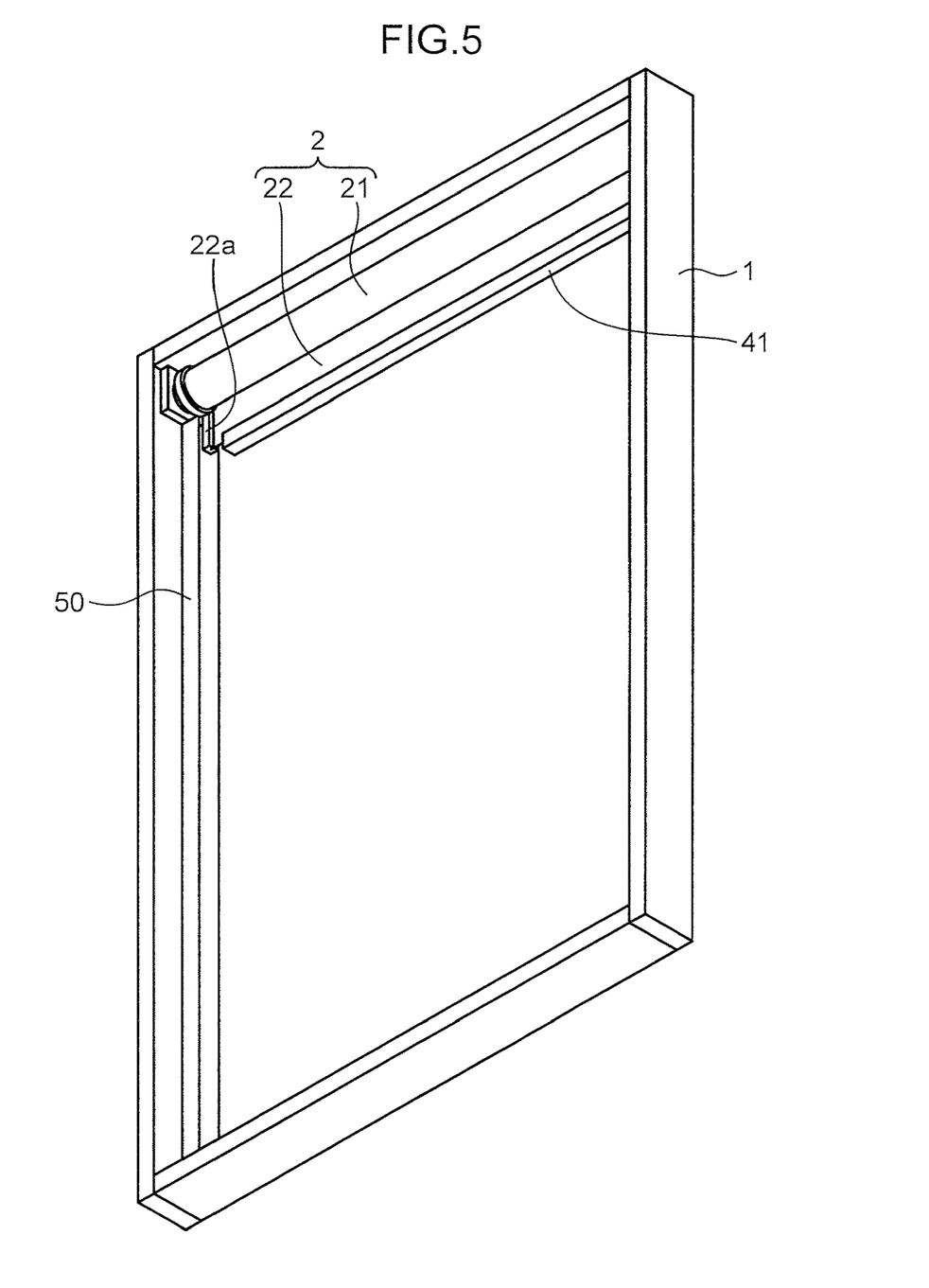
FIG. 5 is a schematic cross sectional view illustrating a state where the outer guider and a roll screen are attached to the frame unit, and showing another step of the production process of the screen apparatus according to the embodiment.

A step of attaching a roll screen 2, a body 41, and an outer guider 50 will be described with reference to FIGS. 4 and 5.

In this step, first, a frame unit 1 made of metal material, resin material or the like is prepared. The frame unit 1 has a substantially rectangular shape in a plan view.

Next, a roll screen 2 including a roll-up shaft 21 and a screen member 22, and a body 41 of a weight bar 4 are prepared, and the roll screen 2 is attached to the frame unit 1 in a state where the body 41 is attached to a lower end of the screen member 22.

Specifically, a screen material made of fabric or the like is formed into a substantially rectangular shape to have an area equivalent to a region surrounded by the frame unit 1. Then, fitter members made of resin material or the like are attached to the opposite side ends of the screen material, i.e. along the opposite longitudinal-side ends of the screen material. Further specifically, the fitter members each having a tape-like shape are bended, and adhered to the opposite side ends of the screen material in such a manner as to enclose the opposite ends of the screen member 33 from the front and back sides of the screen material. In this way, the screen member 22 is made. After that, an upper end of the screen member 22, i.e. one short-side end of the screen member 22, is connected to the roll-up shaft 21 having a cylindrical shape in an axial direction of the roll-up shaft 21. In this manner, the screen member 22 can be rolled up on the roll-up shaft 21 in the circumferential direction of the roll-up shaft 21.

Next, the body 41 is attached to the lower end of the screen member 22. Specifically, the body 41 is arranged along the lower end of the screen member 22, i.e. along the short-side end of the screen member 22 that is opposite to the short-side end connected to the roll-up shaft 21. Here, the length of the body 41 is shorter than the width of the lower end of the screen member 22. Further, the opposite ends of the lower end extend out from the opposite ends of the body 41.

The roll screen 2 attached with the body 41 as in this manner is arranged in the region surrounded by the frame unit along an upper member of the frame unit 1. Further the roll-up shaft 21 of the roll screen 2 is fixedly attached to the members of the opposite both sides of the first unit 1, and is rotatable in the circumferential direction of the roll-up shaft 21.

Subsequently, an outer guider 50 made of metal material, resin material, or the like is prepared, and the outer guider 50 is attached to the frame unit 1. Specifically, the outer guider 50 is formed by extrusion molding in one direction to have a C-like shape extending in the one direction. Then, the outer guider 50 is fastened to a side member of the frame unit 1 by a fastening member 7. In this case, a screw part 72 of the fastening member 7 extends from a recess 54 and passes through a first bottom wall 53 to reach the side member of the frame unit 1. Also, a head 71 of the fastening member 7 is arranged in a third cavity S3 which is a space defined by a first intermediate wall 55 and a second intermediate wall 56.

2) Step of Mounting an Inner Guider 60

Figure 6:
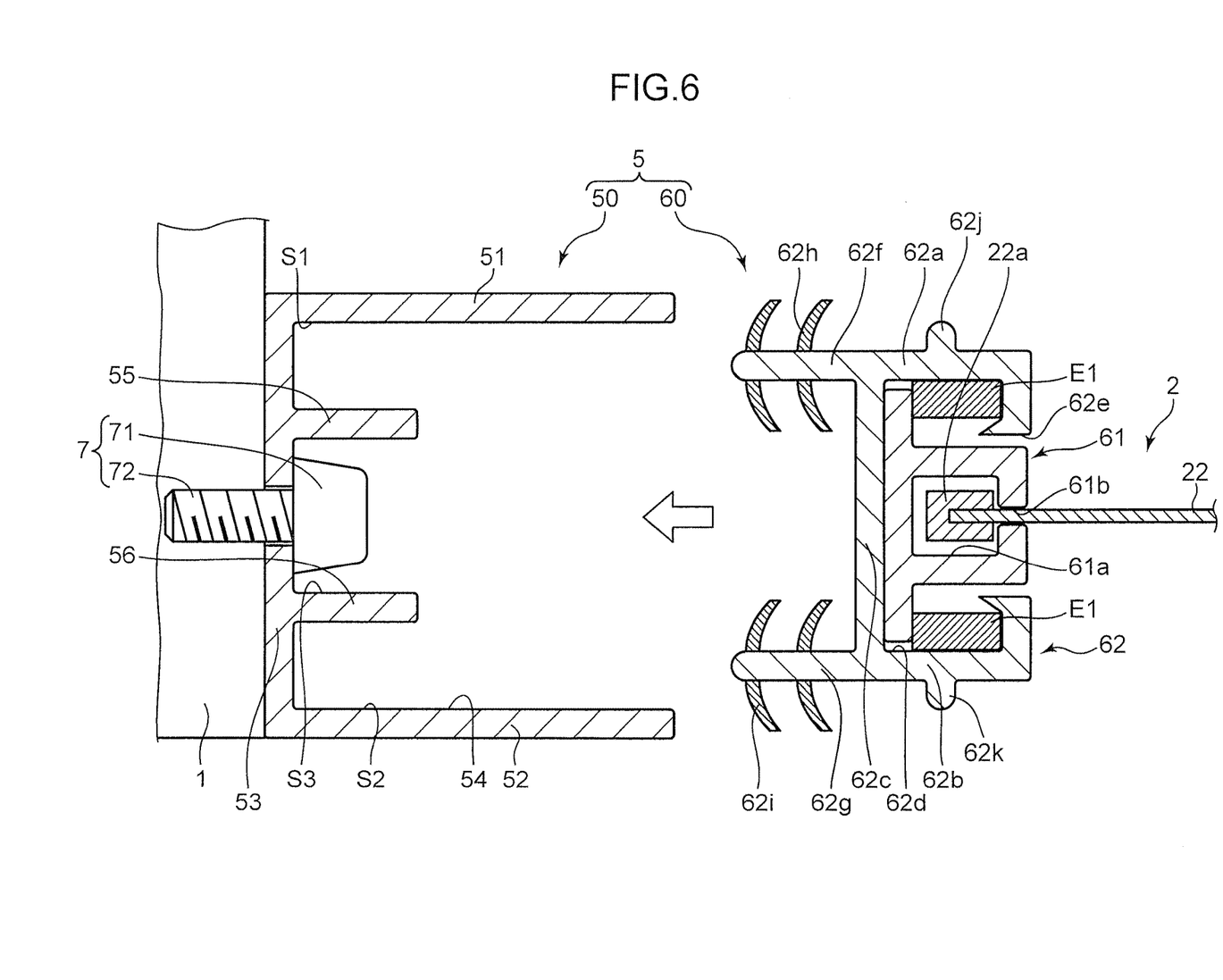
FIG. 6 is a schematic cross sectional view illustrating a state before an inner guider is mounted in a recess of the outer guider, and showing further another step of the production process of the screen apparatus according to the embodiment.
Figure 7:
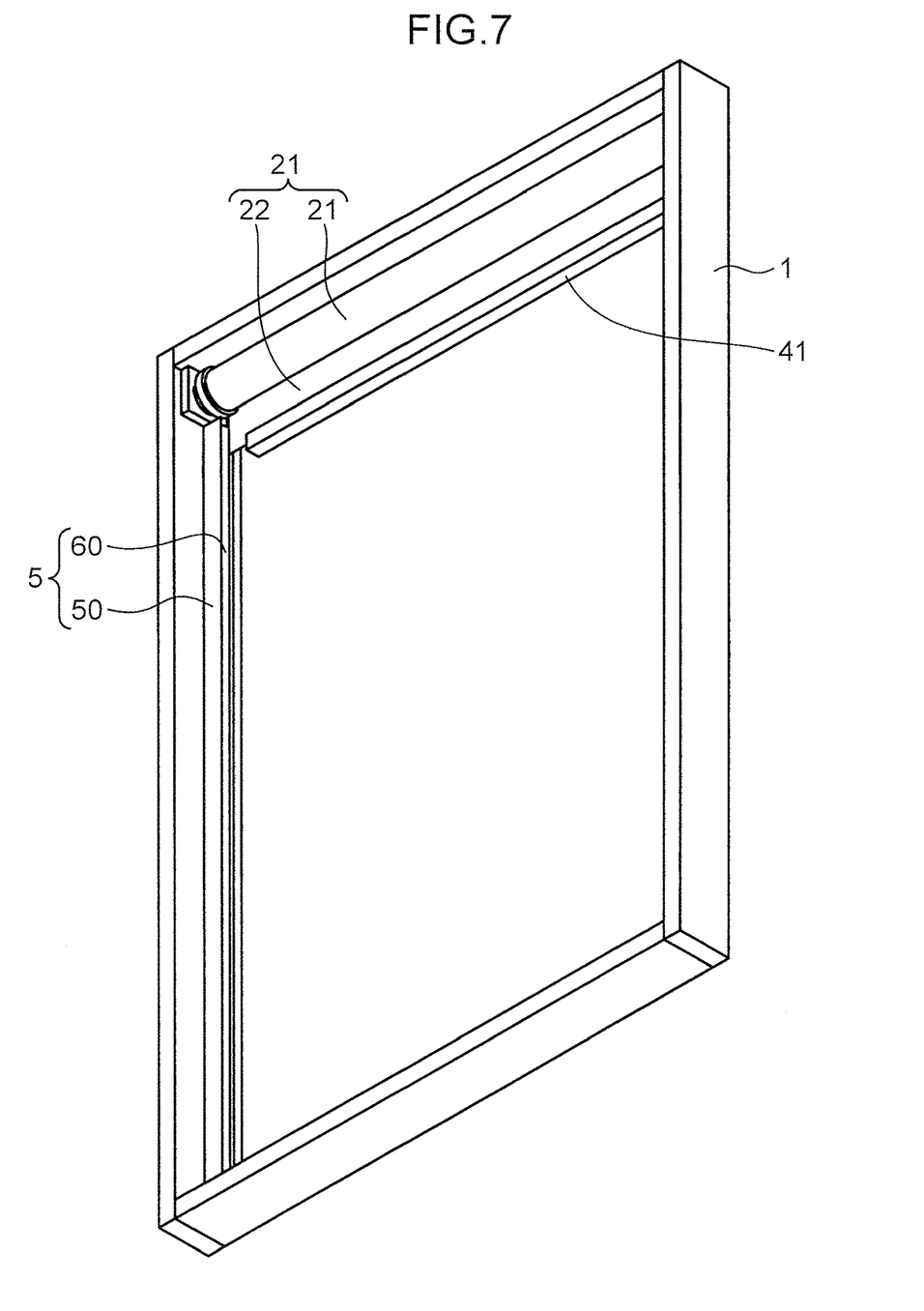
FIG. 7 is a schematic cross sectional view illustrating a state where the inner guider is mounted in the recess of the outer guider, and showing further another step of the production process of the screen apparatus according to the embodiment.

Next, a step of mounting an inner guider 60 will be described with reference to FIGS. 6 and 7.

In this step, first, an inner guider 60 including a first rail member 61 and a second rail member 62 is prepared.

Specifically, first, the first rail member 61 is formed by extrusion molding a resin material to have a hollow shape extending in one direction.

Next, the second rail member 62 is formed by extrusion molding a resin material to have a hollow shape extending in the one direction. Furthermore, first protrusions 62*h* and second protrusions 62*i* of the second rail member 62 are formed by, for example, co-extrusion molding to have the lower elasticity than the other parts.

Then, the first rail member 61 is inserted into a second chamber 62*d* of the second rail member 62 in a longitudinal direction of the second rail member 62. In this way, the first rail member 61 is held in the second chamber 62*d* in a state that the first slit 61*b* is exposed in the second slit 62*e*.

Subsequently, a side end 22*a* of the screen member passes through the first slit 61*b* and is placed in the first chamber 61*a* in the longitudinal direction of the first rail member 61. In this manner, a displacement of the screen member 22 in a short direction of the screen member 22, i.e. in a lateral direction of the screen member 22, is regulated.

After that, the inner guider 60 is mounted in the recess 54 of the outer guider 50 in the lateral direction of the screen member 22. In this case, a first extension 62*f* is inserted into a first cavity S1 defined by a first side wall 51 and the first intermediate wall 55, and a second extension 62*g* is inserted into a second cavity S2 defined by a second side wall 52 and the second intermediate wall 56. These insertions are stopped when leading ends of the first intermediate wall 55 and the second intermediate wall 56 reach positions where the leading ends come into contact with the second bottom wall 62*c*. The inner guider 60 is entirely mounted in the recess 54 of the outer guider 50 at the insertion positions where the insertion is stopped in that manner. Furthermore, the first protrusions 62*h* and the second protrusions 62*i* elastically deform in a thickness direction of the screen member 22 to thereby apply a counterforce caused by the elastic deformation to an inner surface of the outer guider 50. In this manner, the inner guider 60 is held by the outer guider 50.

3) Step of Attaching a Front Cover 3 and Side Caps 42

Figure 8:
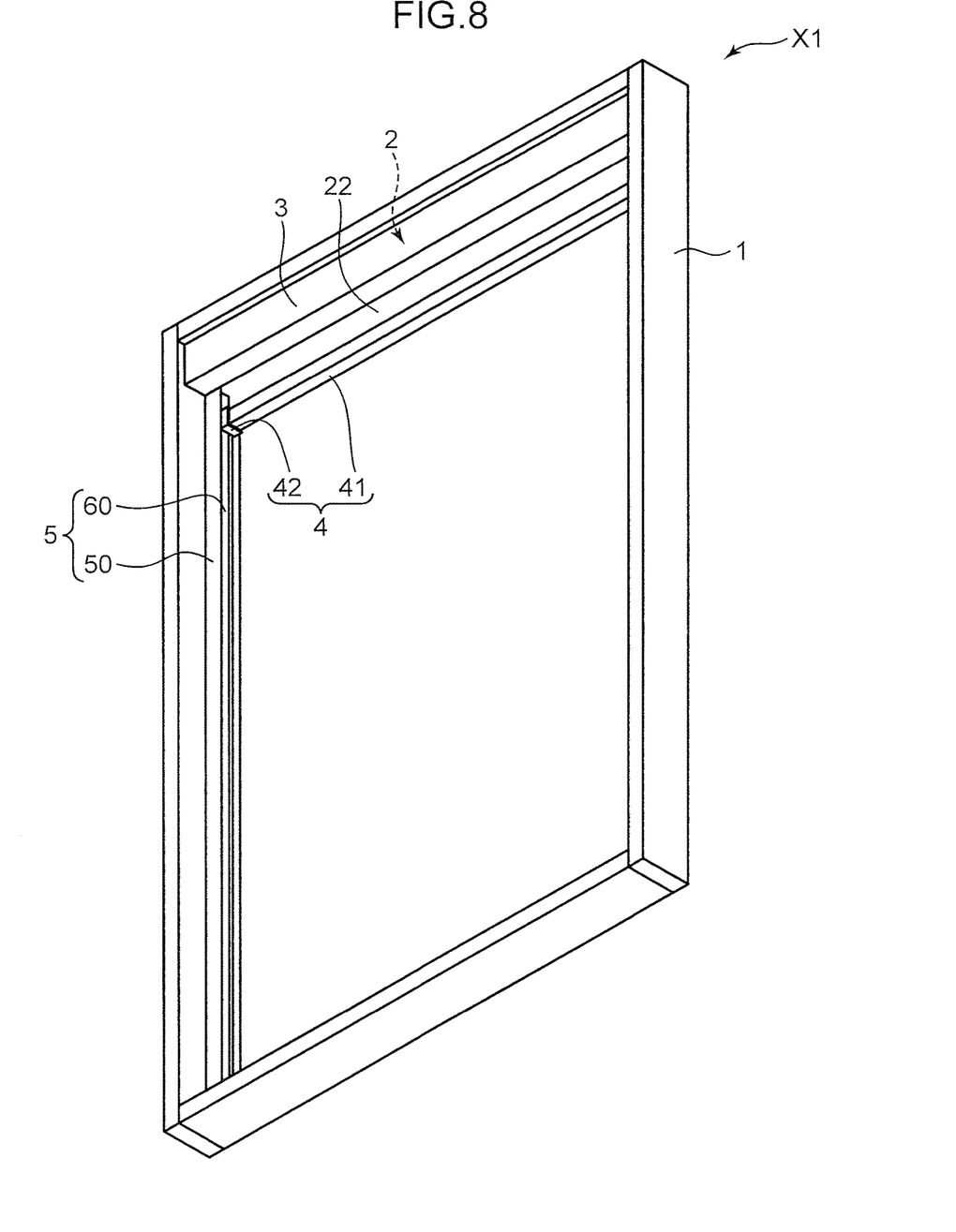
FIG. 8 is a schematic cross sectional view illustrating a state where a front cover and side caps of a weight bar are attached, and showing further another step of the production process of screen apparatus according to the embodiment.

Next, a step of attaching a front cover 3 and side caps 42 of the weight bar 4 will be described with reference to FIG. 8.

In this step, a front cover 3 made of metal material or the like is prepared, and the front cover 3 is attached to the frame unit 1. Specifically, the front cover 3 is formed to have a size which will prevent the roll screen 2 from being seen by a user in a state where the screen member 22 is fully rolled up on the roll-up shaft 21. The front cover 3 is arranged in front of the roll-up shaft 21, and fixedly attached to the frame unit 1 via an unillustrated magnet sheet or the like.

Subsequently, side caps 42 of the weight bar 4 are prepared and attached to the lower end of the screen member 22 that extends out from the opposite ends of the body 41 in the longitudinal direction of the body 41. Specifically, a pair of one member 42*a* and the other member 42*b* constituting each of the side caps 42 are made. Then, one member 42*a* and the other member 42 are arranged on the opposite sides of the portion of the lower end of the screen member 22 that extends out from the body 41. In this case, the end of the body 41 is placed in a recess 42*c* which is a space defined by the one member 42*a* and the other member 42*d*, and a part of the side cap 42 is placed in the recess 54 of the outer guider 50. Moreover, in this state, the one member 42*a* and the other member 42*b* are fixedly coupled with each other by a bis or the like. In this way, vertical movement of the weight bar 4 is guided by the outer guider 50. The above-described body 41 may be attached to the lower end of the screen member 22 together with the side caps 42 in this step.

In the above-described method of installing the screen apparatus X, the outer guider 50 can hold the inner guider 60 without any other attachment. Therefore, the inner guider 60 is dismountable from the recess 54 of the outer guider 50 in the lateral direction of the screen member 22. Accordingly, the maintenance capability of the screen apparatus X1 will be increased.

Particularly, in the stage of attaching the roll screen 2 to the frame unit 1 of the above-described method of installing the careen apparatus X1, only the body 41 of the weight bar 4 is attached to the lower end of the screen member 22. Moreover, in the stage after the inner guider 60 is mounted in the recess 54 of the outer guider 50, the side cap 42 is attached to the portion of the lower end of the screen member 22 that extends out from the body 41. Hence, when the inner guider 60 is dismounted from the recess 54 of the outer guider 50 in the lateral direction of the screen member 22, first, the one member 42*a* and the other member 42*b* are separated from each other to thereby remove the side cap 42. Owing to the removal of the side cap 42, a predetermined gap comes into existence between the body 41 and the outer guider 50 in the lateral direction of the screen member 22. The gap is effectively utilized to easily dismount the inner guider 60 from the recess 54 without detaching the body 41 from the screen member 22. The order of operations of dismounting the inner guider 60 from the recess 54 of the outer guider 50 is not limited to the aforementioned order. For example, the inner guider 60 may be dismounted from the recess 54 after the body 41 is detached from the screen member 22 in addition to the side cap 42. Or, the inner guider 60 may be dismounted from the recess 54 in a state where the body 41 and the side cap 42 are attached to the screen member 22.

Furthermore, in the method of installing the screen apparatus X1, the inner guider 60 is held by the outer guider 50 when the inner guider 60 is mounted in the recess 54 of the outer guider 50 in a state where the inner guider 60 is mounted in the recess 54 and the first extension 62f and the second extension 62g are respectively inserted into the first cavity S1 and the second cavity S2 at the same time to thereby cause the first protrusions 62h and the second protrusions 62j to elastically deform. In this way, it is possible to produce the screen apparatus X through an easy process.

The above-described embodiments merely show examples in all the aspects, and thus should not be considered to be limited. The scope of the invention should be defined by the scope of claims, not the description of the above-described embodiments, and further cover meanings equivalent to those readable in the scope of claims and all the changes falling within the scope of the claims.

For example, the screen apparatus X1 according to the present embodiment can be variously modified as described below.

In the screen apparatus X1, the inner guider 60 is held by the outer guider 50 in a state where the first protrusions 62h and the second protrusions 62i elastically deform in accordance with the insertion of the first extension 62f and the second extension 62g into the first cavity 51 and the second cavity S2. However, the configuration is not limited thereto. The inner guider 60 may be held by the outer guider 50 in any manner without departing from the spirit of the present invention.

For example, the screen apparatus X1 according to the present embodiment may be made without the first protrusions 62h and the second protrusions 62i. Thus, it may be appreciated to adopt a configuration where the inner guider 60 is held by the outer guider 50 by only the insertion of the first extension 62f and the second extension 62g into the first cavity S1 and the second cavity S2.

Figure 9:
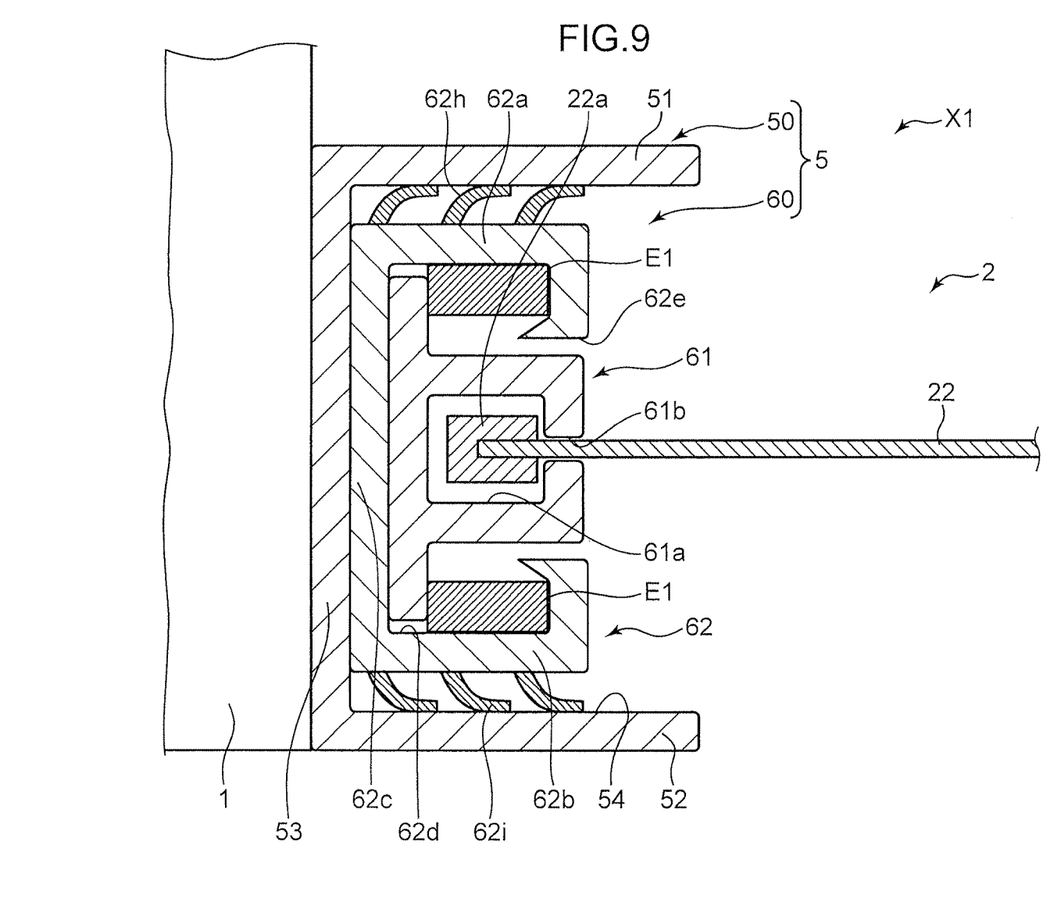
FIG. 9 is a schematic cross sectional view showing a modified screen apparatus according to the embodiment.

Furthermore, as illustrated in FIG. 9, the screen apparatus X1 according to the present embodiment may be made without the first extension 62f and the second extension 62g. Thus, it may be appreciated to adopt a configuration where the first protrusions 62h extend from the first opposite wall 62a to the first side wall 51, and the second protrusions 62i extend from the second opposite wall 62b to the second side wall 52. In this case, the first side wall 51 is applied with a counterforce of elastic deformation caused when the first protrusions 62h elastically deform between the first side wall 51 and the first opposite wall 62a. Similarly, the second side wall 52 is applied with a counterforce caused by elastic deformation when the second protrusions 62i elastically deform between the second side wall 52 and the second opposite wall 62b. In this manner, the inner guider 60 is held by the outer guider 60.

As described above, the modified screen apparatus X1 as illustrated in FIG. 9 does not have the first extension 62f and the second extension 62g respectively extending in the lateral direction of the screen member 22. Hence, it is possible to make the widths of the outer guider 50 and the inner guider 60 in the lateral direction of the screen member 22 narrower than that of the screen apparatus X1 according to the present embodiment.

Hereinafter, the embodiments will be briefly described.

A screen apparatus according to the present embodiment, includes: a screen member; a rail member extending in a vertical direction of the screen member and holding a side end of the screen member movably in the vertical direction while regulating a displacement of the screen member in a lateral direction of the screen member; and a rail accommodating member extending in the vertical direction and having a recess for accommodating the rail member, wherein the rail accommodating member holds the rail member dismountably from the recess in the lateral direction.

In the screen apparatus, the rail accommodating member holds the rail member dismountably from the recess in the lateral direction of the screen member. Therefore, when the maintenance of the screen member is performed, the rail member holding the side end of the screen member can be easily dismounted from the recess of the rail accommodating member. Hence, it is possible to dismount the rail member from the recess of the rail accommodating member, for example, in a state where the rail accommodating member is attached to the frame unit to which the rail accommodating member is fixedly attached along a window frame or the like.

It is preferable that the rail member includes: a chamber extending in the vertical direction for accommodating the side end of the screen member; and a slit extending in the vertical direction and connecting an inside and an outside of the chamber, the slit having a width narrower than a thickness of the side end of the screen member, and the rail member allows the side end of the screen member to pass through the slit and lie in the chamber to thereby regulate a displacement of the screen member in the lateral direction.

In the screen apparatus, the width of the slit is set to be narrower than the thickness of the side end of the screen member to thereby prevent the side end from passing through the slit and shifting out to the outside of the rail member. This configuration makes it possible to regulate the displacement of the screen member in the lateral direction thereof and keep the screen member and the rail member from being separated from each other.

It is preferable that the rail accommodating member includes: a first side wall and a second side wall lying on the opposite sides of the recess in a thickness direction of the screen member; a first bottom wall connecting the first side wall and the second side wall; a first intermediate wall extending from the first bottom wall in the recess; and a second intermediate wall extending from the first wall in the recess and lying closer to the second side wall than the first intermediate wall, the rail member includes: a second bottom wall which faces the first bottom wall; a first extension extending from the second bottom wall to the first bottom wall; a first protrusion extending from the first extension in a direction intersecting an extending direction of the first extension; a second extension extending from the second bottom wall to the first bottom wall and spaced away from the first extension; and a second protrusion extending from the second extension in a direction intersecting an extending direction of the second extension, and the rail accommodating member holds the rail member by an arrangement where the first extension lies in a cavity defined by the first side wall and the first intermediate wall and the first protrusion elastically deforms between the first extension and the first side wall or between the first extension and the first intermediate wall in the thickness direction of the screen member, and the second extension lies in a cavity defined by the second side wall and the second intermediate wall and the second protrusion elastically deforms between the second extension and the second side wall or between the second extension and the second intermediate wall.

In the screen apparatus, when the rail member is mounted in the recess of the rail accommodating member in the lateral direction of the screen member, the first extension is inserted into the cavity defined by the first side wall and the first intermediate wall, and the second extension is inserted into the cavity defined by the second side wall and the second intermediate wall. In this way, the first protrusion and the second protrusion elastically deform in the thickness direction of the screen member, and the counterforce caused by the elastic deformation is applied to at least any one of the first side wall, the first intermediate wall, the second side wall, and the second intermediate wall. Hence, owing to the first protrusion and the second protrusion, it is possible to prevent the first extension and the second extension from inadvertently shifting out from the cavity defined by the first side wall and the first intermediate wall, and from the cavity defined by the second side wall and the second intermediate wall. Accordingly, the rail accommodating member can properly hold the rail member.

It is preferable that the rail accommodating member includes a first side wall and a second side wall lying on the opposite sides of the recess in a thickness direction of the screen member, the rail member includes: a first opposite wall which faces the first side wall; a first protrusion extending from the first opposite wall to the first side wall; a second opposite wall which faces the second side wall; and a second protrusion extending from the second opposite wall to the second side wall, and the rail accommodating member holds the rail member by an arrangement where the first protrusion elastically deforms between the first side wall and the first opposite wall, and the second protrusion elastically deforms between the second side wall and the second opposite wall.

In the screen apparatus, the rail member includes the first protrusion extending from the first opposite wall of the rail member to the first sidewall of the rail accommodating member, and the second protrusion extending from the second opposite wall of the rail member to the second side wall of the rail accommodating member. Hence, when the rail member is mounted in the recess of the rail accommodating member in the lateral direction of the screen member, the first protrusion and the second protrusion can elastically deform in the thickness direction of the screen member in the mounting process. In this manner, it is possible to achieve the mounting of the rail member in the recess and the holding of the rail member by the rail accommodating member at the same time.

The invention claimed is:

1. A screen apparatus, comprising:
a screen member;
a rail member extending in a vertical direction of the screen member and holding a side end of the screen member movably in the vertical direction while regulating a displacement of the screen member in a lateral direction of the screen member; and
a rail accommodating member extending in the vertical direction and having a recess for accommodating the rail member, wherein
the rail accommodating member holds the rail member such that the rail member is configured to be dismounted from the recess in the lateral direction, wherein
the rail accommodating member includes:
a first side wall and a second side wall lying on the opposite sides of the recess in a thickness direction of the screen member;
a first bottom wall connecting the first side wall and the second side wall, and configuring a bottom portion of the recess;
a first intermediate wall extending from the first bottom wall in the recess along the first side wall, and defining a cavity with the first side wall therebetween; and
a second intermediate wall extending from the first bottom wall in the recess along the second side wall, and defining a cavity with the second side wall therebetween,
the rail member includes:
a second bottom wall which faces the first bottom wall;
a first extension extending from the second bottom wall to the first bottom wall, and facing the first side wall at a distance to the first side wall;
a second extension extending from the second bottom wall to the first bottom wall, and facing the second side wall at a distance to the second side wall;
a first protrusion extending from the first extension in a direction intersecting an extending direction of the first extension; and
a second protrusion extending from the extension in a direction intersecting an extending direction of the second extension,
the first protrusion and the second protrusion have lower elasticity than other parts of the rail member,
the first extension lies in the cavity defined by the first side wall and the first intermediate wall and second extension lies in the cavity defined by the second side wall and the second intermediate wall, whereby the first protrusion elastically deforms between the first extension and the first side wall or between the first extension and the first intermediate wall in the thickness direction of the screen member, and the second protrusion elastically deforms between the second extension and the second side wall or between the second extension and the second intermediate wall, and
the rail accommodating member holds the rail member, the rail member being dismounted from the recess in the lateral direction by elastic deformation of the protrusion and the second protrusion.

2. A screen apparatus according to claim 1, wherein the rail member includes:
a chamber extending in the vertical direction for accommodating the side end of the screen member; and
a slit extending in the vertical direction and connecting an inside and an outside of the chamber,
the slit having a width narrower than a thickness of the side end of the screen member, and
the rail member allows the side end of the screen member to pass through the slit and lie in the chamber to thereby regulate the displacement of the screen member in the lateral direction.

3. A screen apparatus according to claim 1, wherein the rail member includes a first rail member which directly holds a side end of the screen member, and a second rail member which holds the first rail member, the second rail member has the second bottom wall, the first extension, the first protrusion, the second extension, and the second protrusion, and an elastic member is placed between the first rail member and the second rail member.

4. A screen apparatus according to claim 3, wherein the second rail member further has a first projection which comes into contact with the first side wall, and a second projection which comes into contact with the second side wall.

* * * * *